US010317008B2

(12) United States Patent
Deleau et al.

(10) Patent No.: US 10,317,008 B2
(45) Date of Patent: Jun. 11, 2019

(54) CONTAINER FOR A SYSTEM FOR STORING AND RESTORING HEAT, COMPRISING AT LEAST TWO MODULES FORMED FROM CONCRETE

(71) Applicant: IFP Energies nouvelles, Rueil-Malmaison (FR)

(72) Inventors: Fabrice Deleau, Pierre-Benite (FR); Thierry Bancel, Pont Salomon (FR); Alice Pourtier, L'Isle d Abeau (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 15 days.

(21) Appl. No.: 15/650,621

(22) Filed: Jul. 14, 2017

(65) Prior Publication Data
US 2018/0017213 A1 Jan. 18, 2018

(30) Foreign Application Priority Data

Jul. 15, 2016 (FR) ...................... 16 56803

(51) Int. Cl.
*F02C 6/16* (2006.01)
*F17C 1/00* (2006.01)
(Continued)

(52) U.S. Cl.
CPC .............. *F17C 1/005* (2013.01); *F02C 6/16* (2013.01); *F17C 1/12* (2013.01); *F28D 17/005* (2013.01);
(Continued)

(58) Field of Classification Search
CPC ..... F28D 2020/0082; F28D 2020/0004; F28D 2020/0021; F28D 2020/0065;
(Continued)

(56) References Cited

U.S. PATENT DOCUMENTS 3,863,408 A * 2/1975 Closner ................. B63B 25/12
220/586
3,926,134 A * 12/1975 Closner ................. B63B 25/12
114/74 R
(Continued)

FOREIGN PATENT DOCUMENTS

EP 1 857 614 B1 3/2010
EP 2 447 501 A2 5/2012
(Continued)

OTHER PUBLICATIONS

Machine Translation of FR 2998556, May 30, 2014.*
Search Report and Opinion issued in corresponding French priority application No. 1656803 dated Mar. 10, 2017 (7 pages).

*Primary Examiner* — Mark A Laurenzi
*Assistant Examiner* — Mickey H France
(74) *Attorney, Agent, or Firm* — Fitch, Even, Tabin & Flannery LLP

(57) ABSTRACT

The invention is a container (200) for a system for storing and restoring heat, comprising a vessel including means for injecting and withdrawing a gas to be cooled or reheated. The vessel is limited by a first jacket formed from concrete (203) surrounded by a thermally insulating layer (206), which is surrounded by a steel shell (204). The vessel comprises at least two modules formed from concrete (210) located one above the other and centered to form a first jacket from concrete (203). Each module formed from concrete comprises a volume limited by a side wall formed from concrete (211) and a perforated base formed from concrete (205). The volume contains a fixed bed of particles of a material for the storage and restitution of heat (207).

18 Claims, 6 Drawing Sheets

(51) Int. Cl.
*F17C 1/12* (2006.01)
*F28D 17/00* (2006.01)
*F28D 20/00* (2006.01)
*F28F 21/04* (2006.01)

(52) U.S. Cl.
CPC .......... *F28D 20/0056* (2013.01); *F28F 21/04* (2013.01); *F17C 2201/0104* (2013.01); *F17C 2203/0639* (2013.01); *F17C 2203/0678* (2013.01); *F17C 2221/031* (2013.01); *F28D 2020/0082* (2013.01); *F28D 2020/0086* (2013.01); *Y02E 20/14* (2013.01); *Y02E 60/142* (2013.01); *Y02E 60/15* (2013.01)

(58) Field of Classification Search
CPC ......... F28D 2020/0078; F28D 20/0056; F28D 20/00; F28D 17/005; F28F 21/04; F17C 2221/031; F17C 2203/0639; F17C 2203/0678; F17C 2201/0104; F17C 1/005; F17C 1/12; F02C 6/16; Y02E 10/10; Y02E 70/30; Y02E 60/142; Y02E 60/14; Y02E 60/145
USPC .......................................................... 60/659
See application file for complete search history.

(56) References Cited

U.S. PATENT DOCUMENTS

| | | | |
|---|---|---|---|
| 4,405,010 A | 9/1983 | Schwartz | |
| 2009/0090109 A1* | 4/2009 | Mills ................... | F28D 20/0056 60/659 |
| 2011/0127004 A1* | 6/2011 | Freund ..................... | F02C 6/16 165/45 |
| 2012/0102937 A1* | 5/2012 | Anikhindi ................ | F02C 1/04 60/413 |
| 2013/0147197 A1* | 6/2013 | Goebel ..................... | F01K 3/12 290/52 |
| 2013/0206356 A1* | 8/2013 | Pedretti ............... | F28D 20/0056 165/10 |
| 2014/0299120 A1* | 10/2014 | Klinkman ........... | F28D 20/0056 126/620 |
| 2014/0299306 A1* | 10/2014 | Bindra ............... | F28D 20/0056 165/200 |
| 2015/0114591 A1* | 4/2015 | Howes ................ | F28D 20/0056 165/10 |

FOREIGN PATENT DOCUMENTS

FR      2 998 556 A1    5/2014
WO      2015/150104 A1  10/2015

* cited by examiner

CONTAINER FOR A SYSTEM FOR STORING AND RESTORING HEAT, COMPRISING AT LEAST TWO MODULES FORMED FROM CONCRETE

CROSS-REFERENCE TO RELATED APPLICATION

Reference is made to French Patent Application No. 16/56.803, filed Jul. 15, 2016, which is hereby incorporated herein by reference in its entirety.

BACKGROUND OF THE INVENTION

Field of the Invention

The present invention relates to the field of heat storage and in particular large volume containers for storing heat such as those used for storing heat using compressed air (CAES, for "Compressed Air Energy Storage"), and in particular for the storage of energy using compressed air of the AACAES type ("Advanced Adiabatic Compressed Air Energy Storage"), in which air is stored and the heat generated is stored independently.

Description of the Prior Art

The majority of primary energy sources such as gas, oil, or coal, can be stored easily and thus can be used to produce electricity on demand, in contrast to the production of electricity from renewable energy sources such as wind energy or solar energy. In order to supply electricity on demand produced by this type of renewable energy, it is necessary to store the electricity. However, it is very difficult to store electricity in large quantities. It is, however, possible to convert the electricity into energy termed "intermediate energy" and to store it in the form of potential, kinetic, chemical or thermal energy.

The electricity may, for example, be stored in the form of compressed air. This is what is carried out in CAES systems in which a type of energy, typically electricity, which is to be used at a given time, is stored in the form of compressed air. For storage, the electrical energy drives air compressors, and to draw on the energy, the compressed air drives turbines which are connected to a generator of electricity. The compressed air is typically stored in an underground cavern, a porous rock formation, an exhausted oil or gas field, or any other compressed air reservoir which may be a pressurized tank. The yield from this solution is not optimal, because part of the energy from the compressed air is in the form of heat which is not used and the heat produced during compression of the air is lost. Furthermore, the stored air is heated to expand the air, which again penalizes the energetic yield of the system.

A number of variations of this CAES system currently exist. In particular, the following systems and processes may be mentioned:

ACAES ("Adiabatic Compressed Air Energy Storage"), in which the air is stored at high temperature due to the compression. However, that type of system requires a specific, bulky and expensive storage system (adiabatic storage).

AACAES ("Advanced Adiabatic Compressed Air Energy Storage"), in which the air is stored at ambient temperature and the heat due to compression is also stored, separately, in a heat storage system, TES ("Thermal Energy Storage"). The heat stored in the TES system is used to heat the air before it is expanded.

In accordance with some designs envisaged for AACAES, the heat is stored using a heat transfer fluid in order to store the heat obtained from compression of the air and to restore it to the air before it is expanded by means of heat exchangers. As an example, patent application EP 2 447 501 describes an AACAES system in which oil, used as the heat transfer fluid, moves in a closed circuit in order to exchange heat with the air.

In accordance with other designs envisaged for AACAES, the heat is stored using static solids contained in one or more containers. As an example, the heat is stored in a material in the form of particles in a fixed bed disposed in one or more containers, and through which the air to be cooled is passed. This heat is restored to the cold air which passes through the fixed bed in the opposite direction during a discharge phase (expansion of air).

The present invention pertains to a container of this latter type which is configured to receive a heat storage material in the form of particles in a fixed bed.

The container is advantageously used to store energy in the form of compressed air of the AACAES type, but it is not limited to this application. Thus, the container may be suitable for any application using a system for storing and restoring heat requiring a large heat storage capacity, and which requires a high resistance to temperatures and pressures. By way of example, fields of application other than that of the storage of energy in the form of compressed air may be cited, such as the field of metallurgy, for example in the context of recovery and restitution of heat from blast furnace fumes, the field of marine energy storage, etc.

A major difficulty arises when designing compressors for heat storage systems which can be operated at high pressures, of the order of several tens of bars, typically at pressures of up to 65-85 bar, and which can function at high temperatures, typically several hundred degrees C., possibly up to 750° C.

In order to resist high temperatures as well as high pressures, TESs generally comprise large cylindrical tanks formed from concrete filled with a heat storage material, which comprise thick walls of pre-stressed concrete which may be reinforced with steel, and which may have a variety of structures for reinforcing the walls, for example of the strut type, in order to resist the stresses exerted on the walls due to the internal pressure.

As an example, a TES is known in the context of adiabatic compressed air storage which can be operated at very high temperatures, for example up to 650° C., and at pressures of up to 65 bar, as described in EP patent 1 857 614 B. That storage system comprises a double structure formed by two capsules nested one in the other, with an outer pressure capsule formed from pre-stressed concrete and an inner capsule formed from heat-resistant concrete and containing the heat storage material, for example stacked ceramic elements. That system is based on a mechanical contribution by the concrete wall in order to contain the internal pressure. This forces production to be on-site with the fabrication of pre-stressed concrete and factory production is not possible. Furthermore, systems of this type, involving the construction of very thick (more than 1 m, for example) cylindrical concrete walls, give rise to problems regarding the engineering, are expensive and are complicated to make. Finally, that system cannot be used to address the pressure constraints envisaged today in TES systems, which are in fact of the order of 125 bar, or even 300 bar.

A heat storage system is also known which can store heat at pressures of more than 3-4 bar, which can be used in quasi-adiabatic compressed air storage systems such as that described in the French patent 2 998 556 A1. A container of that type has refractory concrete walls surrounded by a steel shell, a thermal insulator being provided between the steel shell and the concrete walls. The sandwich structure formed by the refractory concrete wall/insulator/steel shell assembly can be used to reduce thermal losses by insulating the thermal storage material, which means that the temperature of the steel wall can be reduced, thereby limiting degradation of the characteristics of the latter, meaning that the skin temperature of the steel shell can be limited, improving safety, and being able to contain the pressure prevailing in the container as a function of the thickness of the steel shell. The container of FR 2 998 556 A1 also comprises grids for holding the heat storage material which may be disposed at different heights in the container, which also act as struts, limiting the load being exerted on the walls. That configuration can be used to maintain the storage material at different heights in the container, thereby contributing to limiting the stress being exerted on the walls, and also allowing for better distribution of material in the tank, which improves the interaction of the air with the storage material.

During air charging and discharging operations, the structure is subjected to thermal expansions, in particular at the level of the grids. In order to absorb these expansions, the heat storage system of FR 2 998 556 A1 provides for the grids to be fixed to the concrete walls via rings associated with chains, preventing the generation of mechanical stresses during thermal expansion.

However, because of the large forces involved in storing the material, it is difficult to deploy a container of that type comprising grids fixed via a system of rings and chains which is poorly suited to the quantity and weight of the material used, in particular in AACAES type applications in which several hundred tonnes of material in the form of particles are stored in reservoirs with a capacity of about 200 m$^3$ to 1000 m$^3$. Furthermore, a fixing system to that type is bulky.

SUMMARY OF THE INVENTION

The present invention is an implementation of heat storage systems which are adapted to high pressure conditions, which can typically function at pressures of up to the order of 300 bar, and which are adapted to moderate temperature conditions, typically maximum temperatures of the order of 300° C.

In particular, the present invention provides a container for a system for the storage and restitution of heat, which is intended to contain a heat storage material in the form of a fixed bed of particles, which can be operated at high pressure, preferably at pressures of more than 100 bar and up to 300 bar, while limiting the problems linked to thermal expansion during operations for the storage and restitution of heat, to reduce the container fabrication costs and to facilitate assembly of the container.

Thus, in order to accomplish at least one of the above, inter alia, and in order to overcome at least some of the disadvantages of the prior art discussed above, in a first aspect, the present invention is a container for a heat storage and restitution system, comprising a vessel comprising means for injecting and withdrawing a gas to be cooled or heated. The vessel is limited by a first jacket formed from concrete surrounded by a thermally insulating layer, the insulating layer is surrounded by a steel shell and the first jacket is formed from concrete and the insulating layer is not pressure-tight. The vessel comprises at least two modules formed from concrete disposed one above the other in a centered portion in order to form the first jacket formed from concrete. Each module formed from concrete comprises a volume limited by a side wall formed from concrete and a perforated base formed from concrete, the volume being configured to contain a fixed bed of particles of a material for storage and restitution of heat.

In accordance with one embodiment, the modules formed from concrete are monoblocs.

In accordance with one embodiment, the material for the storage and restitution of heat is in the form of particles formed from concrete.

In accordance with one embodiment, the container is in the form of a column, comprising cylindrical modules formed from concrete.

Preferably, the container comprises pressure-equalizing holes in the first and second jackets formed from concrete.

Advantageously, the thermal conductivity is in the range:
0.1 to 2 W·m$^{-1}$·K$^{-1}$ for the jacket formed from concrete,
0.01 to 0.17 W·m$^{-1}$·K$^{-1}$ for the insulating layer, and
20 to 250 W·m$^{-1}$·K$^{-1}$ for the steel shell.

Advantageously, the thickness of the insulating layer is such that, when in use to store heat, the temperature of the steel shell is not more than 50° C., and the insulating layer is preferably selected from a layer of rock wool, perlite, glass wool, cellular glass, an air gap, and more preferably it is a layer of rock wool.

In accordance with one embodiment, the container comprises 2 to 12 modules formed from concrete.

In accordance with one embodiment, the vessel has a volume from 200 m$^3$ to 1000 m$^3$.

In accordance with one embodiment, the container comprises a plurality of vessels assembled in at least one series and parallel.

In accordance with a second aspect, the invention is a system for the storage and restitution of heat, comprising at least one container in accordance with the invention.

In accordance with a third aspect, the invention concerns an AACAES type compressed air energy storage facility comprising:
  a compression system for compressing air during a compression phase;
  a system for the storage and restitution of heat in accordance with the invention in order to store the heat from the air compressed during the compression phase and for restoring the heat to the compressed air during an expansion phase;
  a final reservoir for storing air compressed by the compression system and cooled by the system for the storage and restitution of heat; and
  a device for expanding the compressed air obtained from the final storage reservoir during the expansion phase.

In accordance with one embodiment, the final reservoir has a volume in ranging from 1000 m$^3$ to 7000 m$^3$ and the vessel of the at least one container of the system for the storage and restitution of heat has a volume ranging from 200 m$^3$ to 1000 m$^3$ with the system for the storage and restitution of heat preferably comprising at least three containers.

In accordance with a fourth aspect, the invention is a method for assembling a container in accordance with the invention, comprising:
  installing the steel shell minus a covering cap at the container assembly site, the steel shell being disposed on a support;

assembling the concrete modules, installing the insulating layer and filling the modules with the heat storage material, by successively inserting the modules into the steel shell in a centered configuration in order to form the first jacket formed from concrete;

closing the container by assembling the steel shell with a steel cap which has already been thermally insulated, preferably by welding.

In accordance with one embodiment, the volume of the concrete module is filled with the heat storage material in order to produce a fixed bed of particles once the module has been inserted into the steel shell.

Alternatively, the volume of the concrete module may be filled with the heat storage material in order to produce a fixed bed of particles before inserting the module into the steel shell.

Other aspects and advantages of the invention will become apparent from the following description of particular exemplary embodiments of the invention, given by way of non-limiting examples; the description is made with reference to the accompanying drawings described below.

BRIEF DESCRIPTION OF THE FIGURES

In the figures, the same reference numerals designate identical or analogous elements.

DETAILED DESCRIPTION OF THE INVENTION

Figure 1:
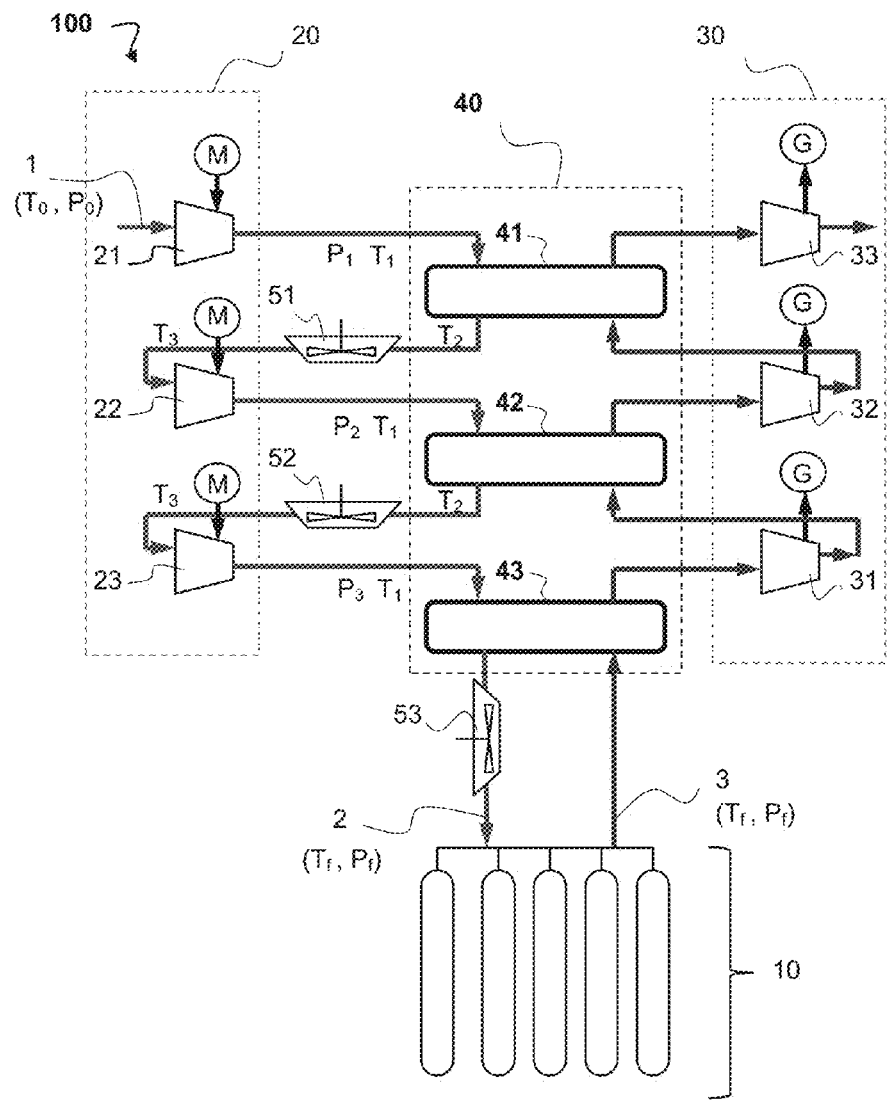
FIG. 1 is a diagram illustrating the principle of an AACAES process in which a system for the storage and restitution of heat (FES) is implemented in accordance with the invention.

FIG. 1 diagrammatically illustrates the principle of the operation of an AACAES facility comprising a system for storage and restitution of heat (TES) in accordance with a non-limiting embodiment of the invention. The features of the TES container in accordance with the invention are not shown in this figure and are described below, in particular in relation to FIGS. 2 to 9.

In FIG. 1, the AACAES facility 100 comprises a system 20 for compressing air, a system 30 for expanding air, a system for storage and restitution of heat of the air denoted TES 40, and a final reservoir 10 for storing the compressed air.

The TES in accordance with the invention is for use with any type of gas, in particular air. In this case, the incoming air used for compression may be taken from the ambient air, and the outgoing air after expansion may be released into the ambient air. In the remainder of the description, only the variation with compressed air will be described. However, any gas other than air may be employed in the TES container in accordance with the invention.

The compression train 20 comprises three compression stages, each stage comprising a compressor 21, 22, and 23. The number of compression stages is a function of the technologies and the performances of the compressors and preferably comprises one to six compressors. The compression train is necessary in order to obtain the desired pressure for the air which is stored in the reservoir 10. Preferably, the pressure of the compressed air in the final reservoir 10 is in the range 50 bar to 300 bar. The compressors are, for example, driven by a motor M, which in particular is an electric motor.

The air expansion system 30 comprises three stages of turbines. The three turbines 31, 32 and 33 are used to expand the air and generate the electric power. The turbines are typically connected to an electricity generator G. The number of expansion stages is preferably identical to that of the compression train.

Typically, the number of turbines equals the number of TES containers, and the number of compressors is greater than or equal to the number of TES containers.

One TES container per compression stage is necessary. Thus, the TES 40 comprises three containers 41, 42, and 43. Each container comprises a vessel defining a volume comprising at least one fixed bed of particles of a heat storage material, and is designed to resist high pressures and moderate temperatures. The heat storage material is capable of storing heat from the air which passes through the container and which is brought into contact with the material, and of restoring stored heat to the air passing through the container at another time. These containers are described in detail below in the description.

During the compression phase, also termed the storage phase or charging phase, heated air produced by compression in a compressor 21, 22, and 23 is admitted into a TES container 41, 42, and 43 and leaves again at a low temperature in order to undergo the subsequent compression stage or be stored in the final reservoir 10. Thus, the air 1 enters the compressor 21 at a temperature $T_0$ and at a pressure $P_0$, for example at 25° C. (ambient temperature) and at atmospheric pressure. The air is compressed in the compressor 21, and is heated due to the compression, and leaves at a temperature $T_1$ and at a pressure $P_1$ which are higher than the initial values ($T_0$, $P_0$), for example at approximately 260° C. and approximately 6 bar. The compressed and heated air then enters the container 41 and passes through the heat storage material with which it exchanges heat, then leaves it cooled to a temperature $T_2$, for example at approximately 100° C. This cooled air may optionally be further cooled in a ventilation device 51 placed at the outlet from the TES container 41, in order to reach a temperature $T_3$ which is lower than the temperature $T_2$, approaching ambient temperature. The temperature $T_3$ is, for example, equal to approximately 50° C. The AACAES facility can then comprise at least one supplemental air cooling device which differs from the TES containers, for example of the ventilator type, in order to reduce the temperature of the air leaving each TES container, and preferably comprises as many supplemental cooling devices, for example of the ventilator type, as there are TES containers, each being positioned on the air line leaving the TES container and entering the compressor of a compression stage or entering the final reservoir 10. The air, optionally cooled in the ventilator 51, is then sent to the compressor 22 to undergo compression again and to increase the temperature concomitantly, and leaves it at a pressure $P_2$ which is higher than the pressure $P_1$, for example at a pressure of approximately 30 bar, and at the temperature $T_1$. The air at the temperature $T_1$ and pressure $P_2$ is then sent to the FES container 42 where it is cooled in the same manner as in the container 41. The air leaves the container 42 at the temperature $T_2$ and is optionally cooled further in the ventilator 52 to the temperature $T_3$, before being sent to the last compressor 23. The compressed air at the outlet from the compressor 23 is at a pressure $P_3$ which is higher than the pressure $P_2$, for example at approximately 125 bar, and is at the temperature $T_1$. It is sent to the FES container 43, then optionally to a ventilator 53, and finally is sent (air 2) and stored in the final air storage reservoir 10, at a storage temperature $T_f$ which is substantially equal to the outlet temperature from the last TES container 43 or possibly at the temperature $T_3$ at the outlet from the last ventilator 53, for example equal to approximately 50° C., and preferably equal to ambient temperature, and a storage pressure $P_f$ which is substantially equal to the pressure $P_3$ at the outlet from the last compressor 23 (mod the pressure drop following passage through the TES container and optionally through the ventilator), for example approximately 125 bar.

During the expansion phase, also known as the withdrawal phase or discharge phase, the cold air produced during the expansion in a turbine is admitted into the TES container 41, 42, and 43 for transfer of the stored heat thereto. Thus, the air 3 leaving the reservoir 10 at the storage temperature $T_f$ and at the storage pressure $P_f$ enters the TES container 43 where it is reheated in contact with the heat storage material which restores the heat collected during the storage phase. The reheated air is then sent to the turbine 31, undergoes an expansion and because of this, it is also cooled. At the outlet from the turbine 31, the cooled air is sent to the TES container 42 for reheating therein, like in the container 43, then again undergoes an expansion and a cooling by passage through the turbine 32. Before it enters the third stage for expansion by the turbine 33, the air leaving the turbine 32 is sent to the TES container 41 in order to undergo a final reheating.

Because of the TES, the heat formed during the air compression phase is advantageously stored in the FES containers and restored during the compressed air expansion phase, thereby ensuring an optimized yield for the facility by limiting the loss of heat during the process. In order to maximize the yield and guarantee an adiabatic system, the TES container has to limit the transfer of heat to the exterior as much as possible. Each TES container preferably has a volume in the range 200 m³ to 1000 m³, typically selected as a function of the energy to be stored. The TES container in accordance with the invention may be used irrespective of the size of the AACAES facility. The volume of the container and the number of containers are selected as a function of the envisaged size of the AACAES system. The flow rate of the air entering and leaving the TES container depends on the stage at which the container is positioned, and in particular depends on the pressure, and is preferably in the range 20 to 200 m³/h. The temperature of the storage material is preferably in the range from ambient temperature, i.e. approximately 25° C., to 300° C., preferably in the range from ambient temperature to 260° C.

In the facility illustrated in FIG. 1, the TES container 43, that is the TES container from which air is sent to the final reservoir 10, is the heat storage device which imposes the most constraints on the scaling of the TES. In fact, it is that which supports the highest stresses linked to compression of the air. In the example given and illustrated in FIG. 1, the TES container 43 has the following characteristics:

it is capable of containing air at a temperature with a maximum of approximately 260° C.;
  it is capable of being operated at a maximum pressure of 125 bar;
  it contains 336 m³ of a heat storage material;
  the heat storage material it contains has a density of 2400 kg/m³ which, for example, produces a bulk density of 1200 kg/m³ assuming a void percentage of 50%;
  the storage material it contains is in the form of beads 10 mm in diameter.

Several compressed air storage units are shown in FIG. 1 which form the final air storage reservoir 10, although this does not constitute a limitation. The compressed air storage reservoir 10 may in fact be composed of one or more air storage units, for example one or more tanks, a system of pipework, or one or more underground caverns. The total volume of the reservoir 10 may be in the range 1000 m³ to 7000 m³ in the case of modestly sized AACAES facilities, and may be up to 100000 m³, depending on the envisaged applications.

The AACAES system comprising a TES container in accordance with the invention is not limited to the example of FIG. 1. Other configurations may be envisaged: a different number of compression stages and/or expansion stages, the use of reversible means for compression and expansion in order to limit the number of devices used in the system and thus to provide a saving in weight and volume of the system, etc.

Figure 2:
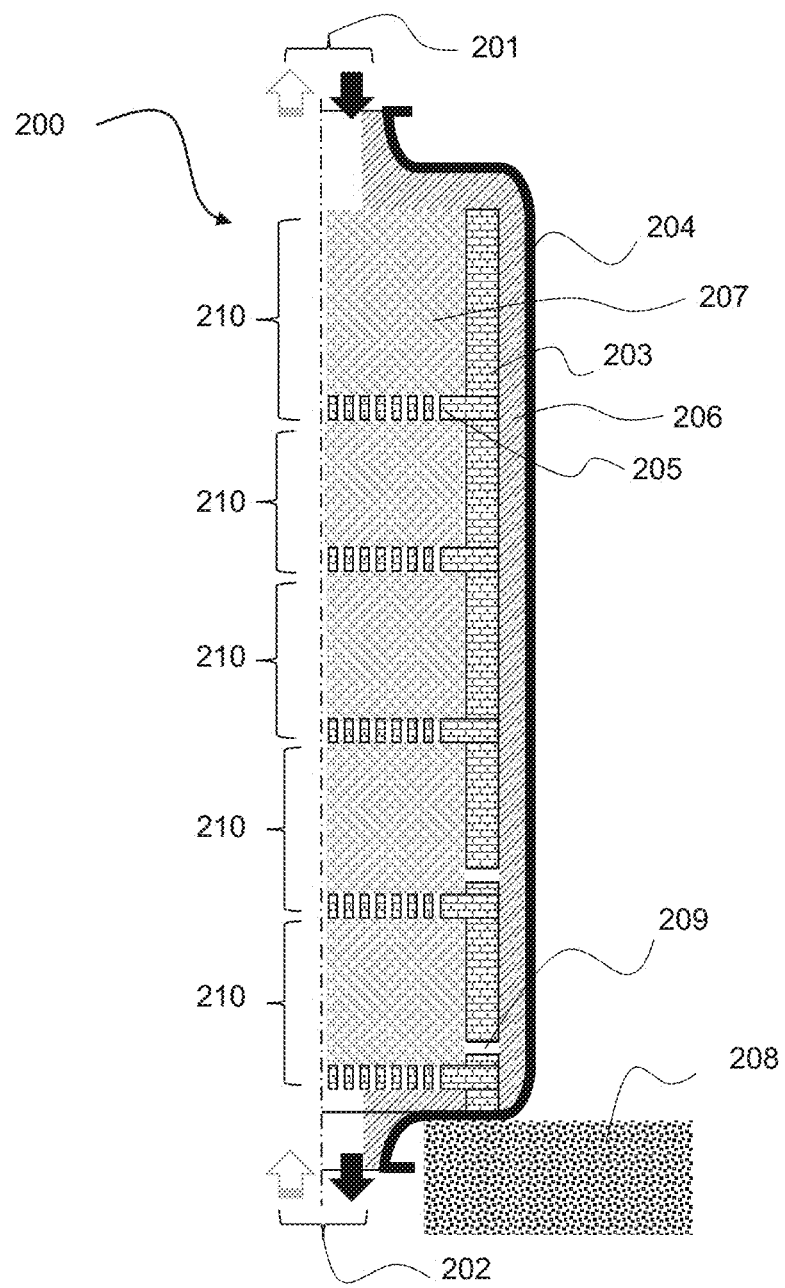
FIG. 2 is a diagram of a TES container in accordance with one embodiment of the invention.

FIG. 2 shows a longitudinal diagrammatic section through a TES container in accordance with one embodiment of the invention. Only half of the container is shown with the other part being symmetrical with it.

The TES container 200 is a vessel which typically has a columnar shape disposed substantially vertically, for example on a support 208 such as the ground, a concrete plinth or any support which can support the weight of the container, comprising, preferably at its top and at its base, injection and withdrawal means 201/202 for a gas to be cooled or reheated, typically air. In FIG. 2, the arrows illustrate the movement of gas in the TES container during two distinct operational phases of the container, typically a charging phase (gas compression phase with storage of heat in the TES) and a discharge phase (expansion of gas with heat being restored to the gas) in an AACAES process. The TES container is not limited to a cylindrical geometry for the vessel, but may also have another shape, such as a parallelepipedal shape. A system of pipework (not shown) is provided to place the container in fluid communication with the other devices of the AACAES facility (compressors, turbines, etc) which may in part be located underground.

Figure 3:
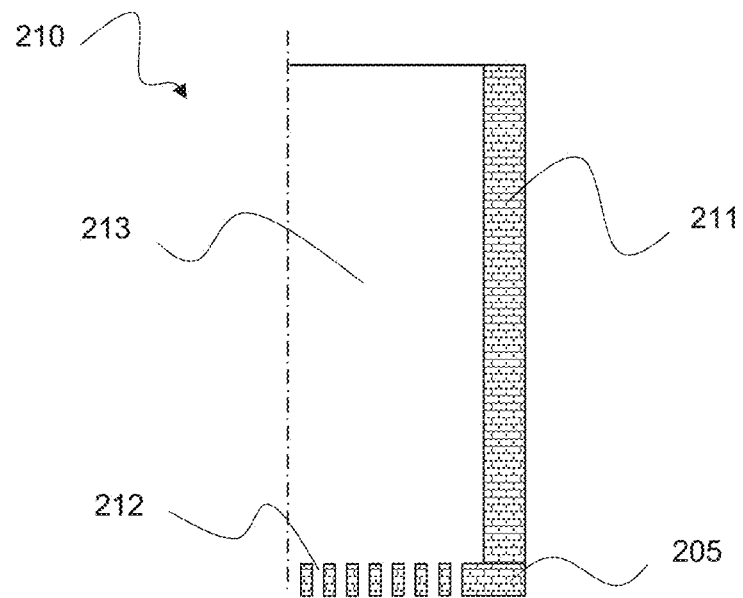
FIG. 3 is a diagram of a concrete module of a TES container illustrated in FIG. 2.

The container 200 comprises at least two concrete modules 210 disposed one above the other, and preferably a succession of a plurality of modules 210 disposed one above the other, as can be seen in FIG. 2. As an example, the container in accordance with the invention comprises between 2 and 12 concrete modules 210, preferably between 3 and 5 concrete modules 210. The modules 210 are positioned in a centered configuration. FIG. 3 diagrammatically illustrates a section of such a module 210. As was the case for FIG. 2, only half of the module is shown with the other half being identical. Each concrete module 210 comprises a concrete side wall 203 and a perforated base formed from concrete 205. The wall and the base limiting a volume 207 which can receive a heat storage material 208 in the form of particles forming a fixed bed of particles (not shown in FIG. 3). The base 205 of the module 210 is typically a plate formed from concrete comprising openings 212 with a size which is smaller than that of the particles of the heat storage material in order to retain the heat storage material, while allowing gas to pass into the container. The base 205 and the wall 203 form two distinct entities, formed by a material of the same nature, that is a concrete. The wall 203 rests on the concrete plate 205. The portion of the plate 205 supporting the wall 203 is preferably imperforate, in order to provide a solid thickness of concrete which is at least equal to that of the wall 203 at the wall/module base junction. Alternatively, the wall 203 comprises a groove in which the periphery of the concrete plate 205 constituting the base of the module is housed (variation not shown in FIG. 3). In this case, the portion of the plate 205 which inserts into the groove of the wall 203 is preferably imperforate, in order to provide a solid thickness of concrete which is at least equal to that of the wall 203 at the wall/module base junction.

Preferably, the side walls of the concrete modules have a thickness in the range 50 mm to 500 mm. Preferably, the base of the concrete modules has a thickness in the range 100 to 300 mm.

Each concrete module 210 preferably has a cylindrical shape, resulting in a container in the shape of a column. However, the concrete module may have another shape, for example parallelepipedal.

The container 200 thus comprises a plurality of fixed beds (at least two) of particles of heat storage and restitution materials 207, each bed being disposed in one concrete module 210. The term "fixed bed of particles" means an assembly of particles arranged in a random manner, which is neither moving nor fluidized.

The concrete modules 210 form a first jacket formed from concrete 203 of the container 200. More precisely, this jacket 203 is formed by the assembly of side walls 203 and portions of the concrete bases 205 in contact with the side walls. The concrete jacket 203 is surrounded by a thermally insulating layer 206, which is itself surrounded by a steel shell 204. The concrete jacket 203 is in contact with the insulating layer 206, which is itself in contact with the steel shell 204.

The concrete jacket 203 preferably has a thickness in the range 50 mm to 500 mm, for example a thickness of 100 mm. The concrete jacket 203 is capable of containing the storage material which may be at a temperature of up to 300° C., for example a temperature in the range between ambient temperature (20° C.) and 300° C., preferably in the range 20° C. to 260° C. The concrete jacket 203 can also tolerate the loads exerted by the heat storage material, in particular the loads linked to the weight of the storage material, which may be several hundred tons. The storage material and the first concrete jacket 203 are contained in a steel shell 204, separated from the first jacket 203 by the thermally insulating layer 206. The concrete jacket 203 and the insulating layer 206 are not pressure-tight. There is no pressure difference on either side of the jacket, and the insulating layer. Thus, the steel shell takes up the internal pressure of the container. The term "internal pressure of the container" means the pressure of the air during operation. In this manner, the pressure of the first jacket 203 is balanced and the steel shell is only subjected to the force due to this internal pressure. The container 200 preferably comprises at least one pressure-equalizing hole 209, which is an opening in the jacket 203 forming a passage between the interior of the vessel and the insulating layer 206, allowing the internal pressure of the vessel to be transmitted to the steel shell 204. Preferably, the container 200 comprises a plurality of pressure-equalizing holes 209, for example disposed in the side walls of each concrete module 210.

The first jacket formed from concrete 203 is principally subjected to compressive forces under moderate temperature conditions, typically of up to approximately 300° C. The modules 210 may be constituted by ordinary or high performance concretes (HPC) which can be subjected to this type of loads without significant degradation of their mechanical performances at the envisaged operating temperatures. Refractory concretes and reinforced concretes may also be employed. The thermal conductivity of the concrete jacket 203 is preferably in the range 0.1 to 2 $W \cdot m^{-1} \cdot K^{-1}$.

The insulating layer 206 can be used to limit the operating temperature of the steel shell by limiting the transfer of heat. The insulating layer 206 can also be used to facilitate the scaling of the steel shell by authorizing a low strain concerning the temperature, in particular scaling at a temperature which may be 50° C. or less, or close to ambient temperature (20° C.) instead of scaling at the maximum service temperature which is 300° C. The thickness of the insulating layer is preferably such that, in use, the temperature of the steel shell is 50° C. or less. The insulating layer 206 is not pressure-tight. This permeability to pressure allows for pressure-balanced operation because of the transmission of the pressure to the steel shell 204. Preferably, the insulating layer has a porosity such that it is not pressure-tight. The thermal conductivity of the insulating layer 206 is preferably in the range 0.01 to 0.17 $W \cdot m^{-1} \cdot K^{-1}$. The insulating layer 206 preferably has a thickness in the range 50 mm to 400 mm, for example a thickness of 100 mm. The thickness of the insulating layer 206 may be reduced by selecting a refractory concrete in order to form the concrete modules 210 (reduced thermal conductivity of a refractory concrete, typically divided by two compared with an ordinary reinforced concrete). The thickness of the insulating layer also depends on the nature of the material selected to form this layer. The insulating layer is preferably a layer of rock wool. Other materials may also be used in order to form the insulating layer 206, such as perlite, glass wool, cellular glass, an air gap.

The steel shell 204, which constitutes the outer jacket of the container 200, can be used to resist the internal pressure of the container. Its thickness is dependent on the load under pressure. Preferably, the thickness of the steel shell does not exceed 300 mm so as to be compatible with currently known fabrication methods (forging, rolling and welding). The thermal conductivity of the steel shell 204 is preferably in the range 20 to 250 $W \cdot m^{-1} \cdot K^{-1}$. Various steels may be used to fabricate the shell 204. Typically, the shell is formed from non-alloyed general usage steel such as P355GH steel.

Such a sandwich structure formed by the succession, from the interior to the exterior of the container 200, of the jacket formed from concrete 203, the insulating layer 206 and the steel shell 204, enables the following:
  decoupling of the weight gain stresses of the storage material and the internal pressure. A suitable structure is dedicated to each stress with the weight of the storage material being borne by the first concrete jacket 203 and the internal pressure is borne by the steel shell 204;
  scaling of the steel shell at ambient temperature because of the insulating layer, thereby enabling the thickness of the steel shell to be reduced, which results in large savings in the mass of steel being used, and as a consequence a reduction in costs, compared with scaling for a temperature of the order of 300° C., and also allowing thicknesses to be obtained which are compatible with the means for producing the steel shell. In fact, producing a TES container comprising a steel vessel with an operating temperature much higher than 50° C., for example 260° C., for the high pressures envisaged, represents a technical challenge, in particular for a reservoir diameter of more than 1 m. Typically, by using a steel such as those routinely used to produce pressurized equipment (PE), for example a steel of the P355GH type, the thickness of the steel wall reaches a minimum thickness of 150 mm. This constitutes a fabrication limit which complicates shaping of the steel, assembly by welding and also transport, because the mass of the reservoirs could reach several hundred tons;

the production of reservoirs with a larger diameter, typically on the order of 4 m.

Since the modules 210 are formed from parts, i.e. walls and bases, constituted by the same material, that is concrete, problems with differential thermal expansion which are known in prior art devices are avoided.

Furthermore, because of the nature of the material composing the modules 210, the modules participate actively in storing the heat in the YES container. Thus, it is possible to increase the heat storage capacity of the FES container initially linked to the single heat storage material in the form of fixed beds of particles and/or to reduce the mass of the storage material in the container for the same heat storage capacity.

Thus, the concrete module 210 has several functions, in particular those of forming the vessel of the container, of participating in the storage and restitution of heat, of acting as a support for the granular heat storage material, and of providing a good distribution of the granular heat storage material over the entire height of the container, which improves the exchanges of heat between the gas and the particles of the storage material with the gas and which prevents settling at the bottom of the container, which could weaken the structure of the container.

The heat storage material is in the form of particles disposed as one fixed bed in each concrete module 210. The heat storage material is thus a granular material which is capable of storing and restoring heat which, without being limiting, may be a concrete, a ceramic, asbestos or gravel.

The shape and size of the particles may vary, and these parameters are selected guaranteeing the passage of air through the bed and of ensuring effective contact between the gas and the particles in order to optimize heat exchanges. Preferably, the particles are substantially spherical, and have a mean diameter in the range 1 to 20 mm.

In accordance with one embodiment of the invention, the particles of heat storage material are formed from concrete. The use of the same material for the particles and for the modules 210 means that the thermal expansion of the particles and the modules accommodating the particles is substantially identical, thereby avoiding any supplemental mechanical stresses.

The particles, typically beads of the heat storage material, are preferably scaled to take account for the thermal expansion of the particles and that of the concrete modules during operation of the container, in particular to prevent any blocking phenomena. When the temperature in the vessel increases, the modules expand and, as a consequence, the granular heat storage material can expand to increase in volume. When a cooling phase occurs, the diameter of the modules decreases and may compress the granular material and thus generate stresses which are harmful to the structure.

As an example, the heat storage material is formed from concrete and is formed as beads with a diameter of 10 mm or more.

Figure 4:
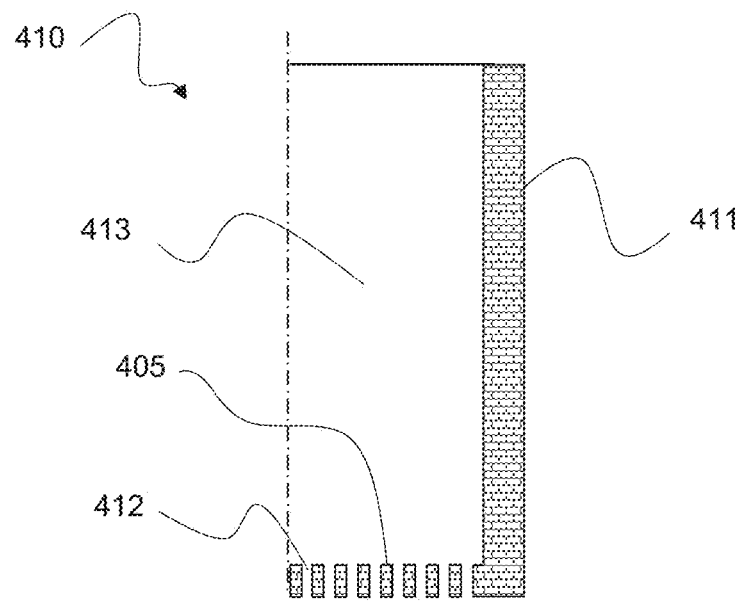
FIG. 4 is a diagram of a concrete module of a TES container in accordance with another embodiment.

In accordance with another embodiment, the concrete module is a monobloc, as illustrated in FIG. 4. The concrete module 410 is formed from a single piece of concrete. It comprises a side wall 411 having by a perforated base 405 and openings 412 which can be used to pass the gas through the container. The volume 413 defined by the side wall 411 and the perforated base 405, as described with the concrete module 210 of FIG. 3, is configured to receive a fixed bed of particles of heat storage material. As was the case with the concrete module 210, problems with differential expansions are reduced because the material for the base and the wall of the module are of the same nature, and the module itself participates in the storage and restitution of heat for the gas passing through the container.

This configuration is also particularly advantageous for the fabrication of the TES container. In fact, whole modules may be fabricated, thereby facilitating assembly of the container by stacking the unitary modules. The modules may also be pre-filled with the heat storage material before assembling them to form the container.

The container 200 in accordance with the invention can be used to store heat from a hot gas, in the particles of the heat storage material 207. The container may also be used to restore the heat stored in the particles to a cold gas. The gas enters or leaves the container 200 via its ends, at the level of the injection and withdrawal means 201 and 202, and exchanges heat with the particles of the material for storage and restitution of heat 207 which are in beds to allow gas to pass through them. The passage of fluid in the fixed bed of particles is substantially axial, and generally moves in the direction of the principal axis between the inlet and outlet points for the gas in the container 200, which typically are located at two opposite ends of the container 200. Typically, the gas passes through substantially vertically. In accordance with this configuration, during charging, the entering fluid is hot, at a temperature $T_1$, at the top of the container, and leaves cold (cooled by the particles which store a portion of the heat from the gas), at a temperature $T_2$ ($T_2<T_1$), via the base of the container. For discharge, the gas enters cold, at a temperature $T_2$, via the base of the container, and leaves hot (heated by the particles which restore a portion of the heat of the particles), at a temperature $T_1$, via the top of the container. The configuration described constitutes a preferred configuration in which the container comprises a hot zone in its upper portion, due to the entry of hot gas during the charging phase and the exit of reheated gas during discharge, and a cold zone in the lower portion due to the exit of gas cooled during the charging phase and the entry of cold gas during the discharge phase. A hot zone in the upper portion can in particular be used to minimize the movements of air during a waiting phase before the discharge phase. However, the container may be used in accordance with a reversed configuration, in which the hot zone is in the lower portion and the cold zone is in the upper portion. In this case, during the charging phase, the hot gas to be cooled arrives at a temperature $T_1$, via the bottom of the container and leaves cold, at a temperature $T_2$ ($T_2<T_1$), via the top of the container, and during discharge, the gas enters cold, at a temperature $T_2$, via the top of the container, and leaves hot at a temperature $T_1$, via the bottom of the container.

Advantageously, the TES container in accordance with the invention is capable of operating at pressures in the range of 1 bar to 300 bar, in particular in the range of 100 bar to 300 bar, and more particularly in the range of 100 to 150 bar, and at temperatures in the range between ambient temperature, generally 20° C., and 300° C., preferably between ambient temperature and 260° C.

In accordance with one embodiment, the TES container does not form a single reservoir, but comprises a plurality of vessels each defined as described above for the vessel of the TES container illustrated in FIG. 2, that is comprising means for injecting and withdrawing gas, preferably at its top and at its base. Each vessel is limited by a first jacket formed from concrete surrounded by a thermally insulating layer which is surrounded by a steel shell. Each vessel comprises at least two modules formed from concrete disposed one above the other in a centered configuration to form the first concrete jacket. Each concrete module comprises a volume limited by a side wall formed from concrete and a perforated base with the volume containing a fixed bed of particles of a material for the storage and restitution of heat. The various vessels are in fluid communication and are assembled in series and/or parallel in order to form a TES container of elements with a reduced size and weight. "Series and/or parallel assembly" should be understood to mean with respect to a gas sent to the vessels of the TES container: in an assembly in series, the gas passes in succession through the various vessels of the TES container, while in an assembly in parallel, the stream of gas to be cooled/heated is divided into a plurality of sub-streams each injected into the vessel of the TES container.

The TES container in accordance with the invention is preferably used in an AACAES system as described with respect to FIG. 1. However, the use of the TES container in accordance with the invention is not limited to storing energy by compressed air of the AACAES type. The TES container in accordance with the invention may also be used in other applications in which storage and restitution of heat for a gas are required, under high pressure conditions, for example for use in district heating or in concentrated solar power plants. These various applications require energy storage if the energy is not consumed during production. As a consequence, the energy available in the form of a flow of heat may be stored in a system for the storage and restitution of heat (TES) in accordance with the invention, comprising at least one container as has been described.

Figure 5:
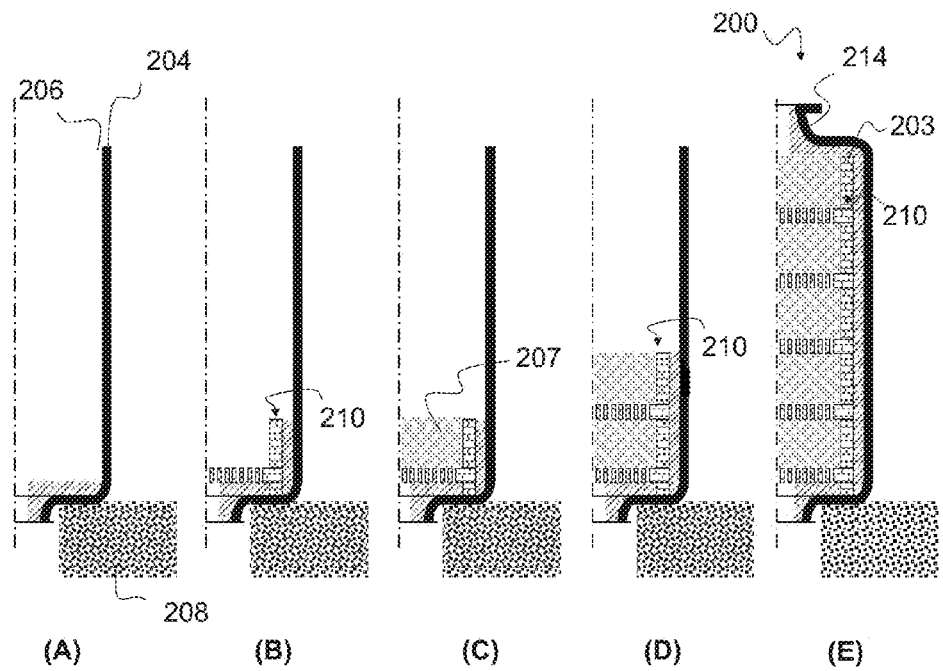
FIG. 5 is a diagram illustrating an example of assembling the TES container represented in FIG. 2.

FIG. 5 illustrates a non-limiting example of assembling the TES container in accordance with the invention. Diagrams (A) to (E) illustrate the succession of steps for assembling the TES container of the invention. In accordance with this example of assembly, the steps below are carried out.

A first step (diagram A) for on-site installation of the steel shell 204 without its covering cap 214, and of the insulating layer 206 is carried out. The steel shell may also be described by the term casing. The steel shell 204 is deposited on a support 208, for example the ground.

Advantageously, the steel shell is pre-fabricated, that is the sheet-metal work on the shell is carried out in the workshop and it is transported to the assembly site as a single piece. In this case, only the welding or assembly of the cover 214 is carried out at the assembly site after inserting the concrete modules 210 and the heat storage material into the steel shell and placing the insulation between the concrete modules and the steel shell.

Alternatively, the steel shell 204 is divided into a plurality of elements which are transported to the assembly site and assembled on-site by welding.

A second step (diagrams B to C) for assembling the concrete modules, for positioning the insulating layer 406, and for filling the modules with the heat storage material 207 is carried out.

Once the steel shell 204 has been installed, each stage of the container comprising one module is preferably installed as follows, in this order:
  positioning of the concrete module;
  installation of the insulation between the outer concrete wall 211 and the steel shell 404. The insulation may typically be rock wool, loose or on a roll;
  filling the concrete module with the selected storage material 207.

The first concrete module 210 inserted into the steel shell via the open top of the shell 204 will come to rest on the bottom of the shell which has already been thermally insulated.

When assembling successive modules, it is ensured that the modules are centered one with respect to the other as they are being stacked, in order to create a continuous wall of the first jacket formed from concrete 203.

In accordance with an alternative, the concrete modules 210 may be filled with the heat storage material 207 before installing the insulation 206 between the outer concrete wall 418 and the steel shell 404.

In accordance with another alternative, the concrete modules 210 may be filled with the heat storage material 207 before being inserted into the steel shell 204.

A third step of closing the container 200 is carried out by assembling the shell 204 with its steel cap 214 which has already been thermally insulated, preferably by welding the cover 214 with the steel wall of the shell 204.

Positioning of the other devices, such as the means for injecting and withdrawing gas, has not been detailed because this can readily be carried out.

The pressure-equalizing holes are not shown in FIG. 5. They are preferably produced in the concrete modules before positioning the modules in the steel shell.

Figure 7:
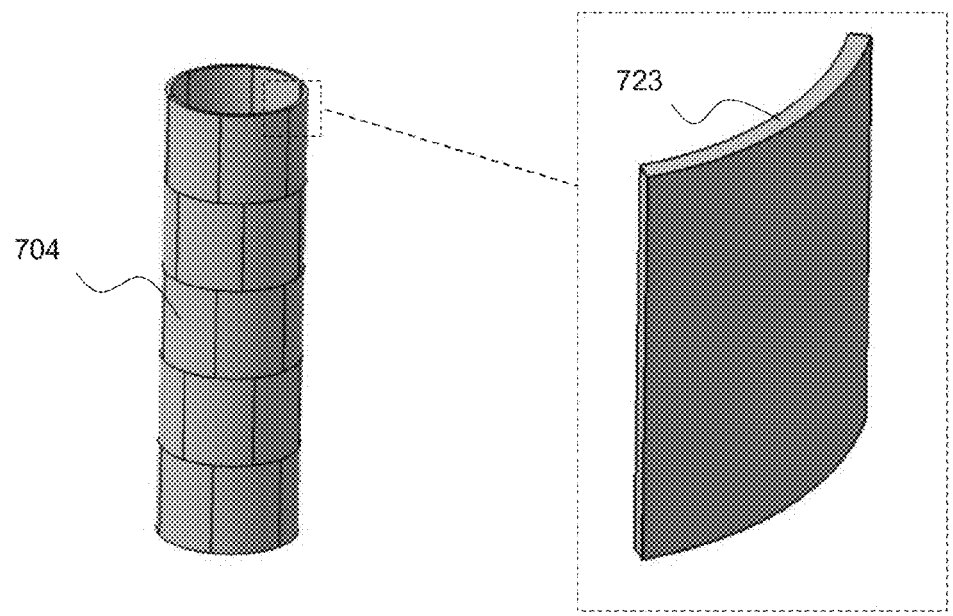
FIG. 7 is a 3D view of a first example of a steel shell of a TES container in accordance with the invention.
Figure 8:
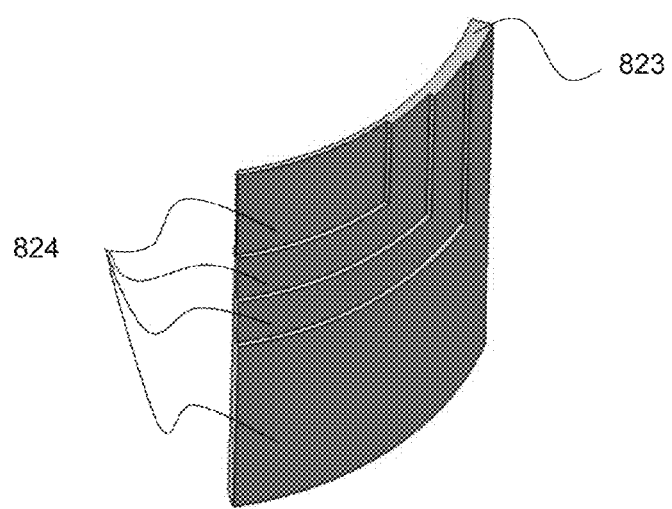
FIG. 8 is a 3D view of a second example of a steel shell of a TES container in accordance with the invention.
Figure 9:
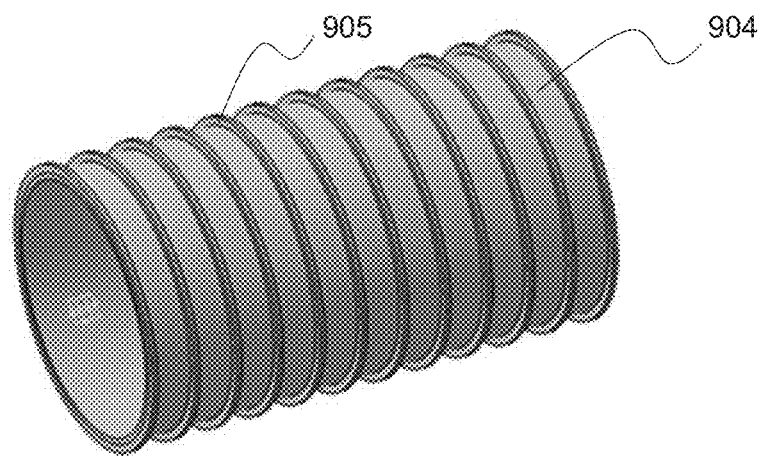
FIG. 9 is a 3D view of a third example of a steel shell of a TES container in accordance with the invention.

The steel shell 204 may be fabricated using a variety of techniques:
  The steel shell may be assembled by welding curved sheets of a single thickness. FIG. 7 illustrates a shell 704 of this type, composed of welded sheets 723 of a single thickness. The initially flat sheets are curved to the radius of the vessel and are then assembled by welding in order to form the steel shell 704 which has a single-layered wall.
  The steel shell may also be assembled by welding curved sheets into multiple layers in order to work with single thicknesses of sheets which are smaller than the thickness of a sheet used to form a mono-layered shell. A portion of such a shell is illustrated in FIG. 8 where several layers 824 of sheets can be seen which are superimposed to form the wall 823 of the steel shell. This technique can be used to facilitate the sheet shaping operation. In accordance with this fabrication technique, the upper layers may be assembled with a pre-tension in order to produce a multi-layered shell with an interference fit on the outer layers. Placing the lower layers under compression results in the support of larger loads or support of a similar load for a smaller thickness, which has the advantage of optimizing the quantity of steel necessary for the construction.
  the steel shell may also be fabricated by assembling single thickness curved sheets, preferably by welding, such as in the mono-layered shell illustrated in FIG. 7, which are reinforced with circumferential rings. This technique can be used to obtain a shell with a thinner wall which is resistant to high pressure stresses. FIG. 9 is a 3D drawing illustrating such a shell formed from steel 904 stiffened by the presence of circumferential rings 905. The steel shell is cylindrical in shape and comprises a plurality of circumferential reinforcing rings 905 (12 in number in FIG. 9). The circumferential rings 905 are preferably produced from metal, in particular from steel.

Example

A numerical example concerning a TES container in accordance with the invention used in an AACAES system as shown in FIG. 1 as the last container 43 before passing the gas into the final reservoir 10 (or first container when the gas leaves the reservoir 10) is given below.

A TES container in accordance with the invention comprises, for example, a vessel formed by a concrete jacket 203 having an internal diameter of 3.5 m and a thickness of 100 mm, which can tolerate an internal pressure of 125 bar and a high temperature of the order of 260° C. An insulating layer formed from rock wool with a thickness of 100 mm is placed between the concrete jacket 203 and the steel shell 204, allowing the temperature of the steel wall of the shell to be limited to 50° C. The steel shell has an internal diameter of 3.9 m and is 146 mm thick. A TES container of this type develops an internal volume of 672 m$^3$, meaning that it can contain 806 tons of a storage material having a density of 1200 kg/m$^3$, for example. Five stages are formed by stacking five concrete modules 210. Each is 14 m in height and is provided to form the container with a total height of the order of 70 m (this height does not take into account the dimensions of the devices at the base and at the top of the container). In this example, the various layers have the following thermal conductivities: 0.92 W·m$^{-1}$·K$^{-1}$ for the concrete jacket, 26 W·m$^{-1}$·K$^{-1}$ for the wall of the steel shell, and 0.04 W·m$^{-1}$·K$^{-1}$ for the insulating layer.

Figure 6:
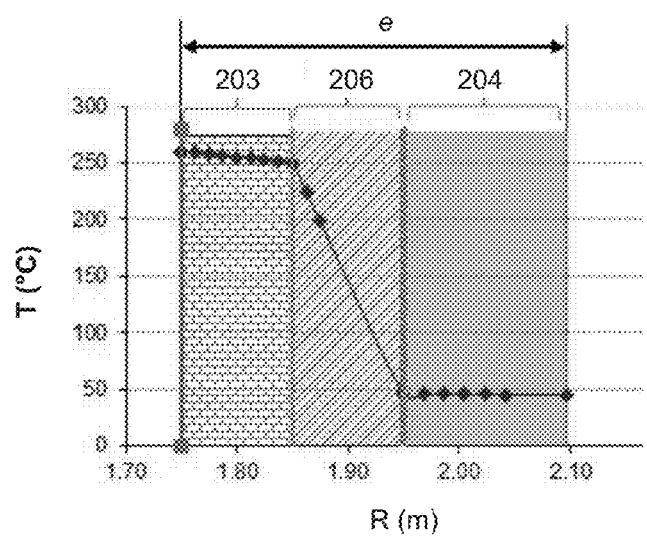
FIG. 6 is a graph illustrating the change in temperature through the multi-layered wall of the TES container illustrated in FIG. 2.

FIG. 6 illustrates the change in temperature (temperature up the ordinate in ° C.) in the multi-layered wall (radius of container along the abscissa in meters) of this example of the TES container in accordance with the invention. The wall is formed with the concrete jacket 203, the insulating layer 206 and the steel shell 204. The total thickness "e" of the wall of the TES container is 346 mm, respectively with a thickness of the first concrete jacket 203 of 100 mm, a thickness of the insulating layer 206 of 100 mm, and a thickness of the steel shell 204 of 146 mm. It can be seen that with a temperature of 260° C. in the vessel of the container, the temperature in the steel shell 204 has dropped to less than 50° C.

In order to fabricate a TES container of this type, 190 tons of concrete and 1000 tons of steel are necessary.

The invention claimed is:

1. A container for a heat storage and restitution of heat to particles inside the container, comprising:
   a vessel including means for injecting and withdrawing a gas to be cooled or heated, the vessel including a jacket formed from concrete including pressure equalizing holes formed in the concrete of the jacket and surrounded by a thermally insulating layer, the insulating layer being surrounded by a steel shell with the jacket and insulating layer not being pressure-tight; and wherein
   the vessel comprises at least two modules formed from concrete which are disposed one above the other in a centered configuration to form the jacket, each module having a volume limited by a side wall formed from concrete and a base formed from concrete with perforations formed therein with the volume being configured to contain a fixed bed of the particles for the storage and restitution of the heat.

2. The container as claimed in claim 1, in which the modules are monoblocs.

3. The container as claimed in claim 1, wherein the material for the storage and restitution of heat is concrete particles.

4. The container as claimed in claim 2, wherein the material for the storage and restitution of heat is concrete particles.

5. The container as claimed in claim 1, wherein the modules are cylindrical in shape.

6. The container as claimed in claim 2, wherein the modules are cylindrical in shape.

7. The container as claimed in claim 3, wherein the modules are cylindrical in shape.

8. The container as claimed in claim 1, wherein the thermal conductivity ranges:
   0.1 to 2 W·m$^{-1}$·K$^{-1}$ for the first jacket,
   0.01 to 0.17 W·m$^{-1}$·K$^{-1}$ for the insulating layer, and
   20 to 250 W·m$^{-1}$·K$^{-1}$ for the steel shell.

9. The container as claimed in claim 1, wherein a thickness of the insulating layer controls a temperature of the steel shell to be no more than 50° C., and the insulating layer is selected from a layer of rock wool, perlite, glass wool, cellular glass, an air gap.

10. The container as claimed in claim 1, comprising 2 to 12 modules formed from concrete.

11. The container as claimed in claim 1, wherein the vessel has a volume ranging from 200 m$^3$ to 1000 m$^3$.

12. The container as claimed in claim 1, comprising vessels are assembled in at least one of series and parallel.

13. A system for the storage and restitution of heat, comprising at least one container as claimed in claim 1.

14. A compressed air AACAES energy storage facility, comprising:
   a compression system for compressing air during a compression phase;
   a system for the storage and restitution of heat as claimed in claim 13 for storing heat from the air compressed during a compression phase and for restoring the heat to the compressed air during an expansion phase;
   a storage reservoir for storing air compressed by the compression system and cooled by the system for the storage and restitution of heat; and
   a device for expanding the compressed air obtained from the storage reservoir during the expansion phase.

15. The storage facility as claimed in claim 14, wherein the reservoir has a volume ranging from 1000 m$^3$ to 7000 m$^3$ and the vessel has a volume ranging from 200 m$^3$ to 1000 m$^3$, and the system for the storage and restitution of heat comprises at least three containers.

16. A method for assembling a container as claimed in claim 1, comprising:
   installing the steel shell a covering cap at a container assembly site with the steel shell being disposed on a support;
   assembling the modules, installing the insulating layer into the modules and filling the modules with the particles, by successively inserting the modules into the steel shell in a centered configuration to form the jacket; and
   closing the container by assembling the steel shell with the steel cap which is thermally insulated.

17. The assembly method as claimed in claim 16, wherein a volume of each of the modules is filled with the heat storage material provided after each module is inserted into the steel shell.

18. The assembly method as claimed in claim 16, wherein a volume of each of the modules is filled with the particles before inserting the module into the steel shell.

* * * * *